(12) United States Patent
Ward, Jr.

(10) Patent No.: US 10,922,666 B1
(45) Date of Patent: Feb. 16, 2021

(54) RESOURCE MANAGEMENT FOR LOGICAL AND PHYSICAL AVAILABILITY ZONES OF A PROVIDER NETWORK

(71) Applicant: Amazon Technologies, Inc., Reno, NV (US)

(72) Inventor: David John Ward, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 959 days.

(21) Appl. No.: 14/312,515

(22) Filed: Jun. 23, 2014

(51) Int. Cl.
*G06Q 20/14* (2012.01)

(52) U.S. Cl.
CPC ................... *G06Q 20/14* (2013.01)

(58) Field of Classification Search
None
See application file for complete search history.

(56) References Cited

U.S. PATENT DOCUMENTS

| | | | | |
|---|---|---|---|---|
| 9,038,065 | B2* | 5/2015 | Arroyo | H04L 41/0806 718/1 |
| 9,634,958 | B2* | 4/2017 | Ennaji | H04L 47/828 |
| 9,639,875 | B1* | 5/2017 | Elliott | G06Q 30/0611 |
| 9,674,042 | B2* | 6/2017 | Lissack | H04L 43/0817 |
| 9,727,716 | B1* | 8/2017 | Rodriguez Magana | H04L 29/08099 |
| 9,727,848 | B2* | 8/2017 | Bligh | G06Q 20/14 |
| 9,760,952 | B2* | 9/2017 | Chen | G06Q 40/12 |
| 9,813,307 | B2* | 11/2017 | Walsh | H04L 67/025 |
| 9,948,514 | B2* | 4/2018 | Kansal | H04L 41/0896 |
| 9,992,076 | B2* | 6/2018 | Mason | H04L 41/5051 |
| 10,009,238 | B2* | 6/2018 | Iyer | G06F 9/5072 |
| 10,069,690 | B2* | 9/2018 | Dragon | H04L 43/04 |
| 2009/0276771 | A1* | 11/2009 | Nickolov | G06F 9/4856 717/177 |
| 2012/0290460 | A1* | 11/2012 | Curry, Jr. | G06Q 30/08 705/37 |
| 2013/0282540 | A1* | 10/2013 | Bliesner | G06Q 20/145 705/34 |

OTHER PUBLICATIONS

AWS Billing and Cost Management User Guide, version 2.0, available at http://awsdocs.s3.amazonaws.com/awsaccountbilling/latest/awsaccountbilling-aboutv2.pdf, downloaded Jun. 4, 2014, pp. 46-50.

(Continued)

*Primary Examiner* — Narayanswamy Subramanian
(74) *Attorney, Agent, or Firm* — Robert C. Kowert; Kowert, Hood, Munyon, Rankin & Goetzel, P.C.

(57) ABSTRACT

A provider network may implement resource management and billing for logical and physical availability zones. Consolidated billing techniques may be applied to the aggregate usage of multiple linked user accounts. A billing setting may indicate whether consolidated billing is performed according to resource consumption in logical availability zones or physical availability zones. Mappings to physical availability zones may be provided to linked user accounts so that computing resources may be consumed according to either logical or physical availability zones. Capacity reservations for computing resources for a particular physical availability zone may be made available to each of the linked user accounts for consumption.

14 Claims, 9 Drawing Sheets

(56) References Cited

OTHER PUBLICATIONS

Amazon Elastic Compute Cloud User Guide—Regions and Availability Zones, API Version Oct. 15, 2013, available at http://docs.aws.amazon.com/AWSEC2/latest/UserGuide/using-regions-availability-zones.html, downloaded Jun. 4, 2014, pp. 7-8.
Amazon Elastic Compute Cloud User Guide—Reserved Instance Fundamentals, API Version Oct. 15, 2013, available at http://docs.aws.amazon.com/AWSEC2/latest/UserGuide/using-regions-availability-zones.html, downloaded Jun. 4, 2014, pp. 205-206.

* cited by examiner

| Line Item Account | Logical AZ A usage (e.g., hours) |
|---|---|
| Linked User Account 122 | 101 |
| Linked User Account 124 | 78 |
| Linked User Account 126 | 24 |
|  |  |
| Payment Account 120 | 203 |

*FIG. 2A*

| Line Item Account | Physical AZ 102a usage (e.g., hours) | Physical AZ 102b usage (e.g., hours) | Physical AZ 102c usage (e.g., hours) | Physical AZ 102d usage (e.g., hours) |
|---|---|---|---|---|
| Linked User Account 122 | 101 | 19 | 0 | 0 |
| Linked User Account 124 | 0 | 36 | 42 | 10 |
| Linked User Account 126 | 20 | 0 | 32 | 24 |
|  |  |  |  |  |
| Payment Account 120 | 121 | 55 | 74 | 34 |

*FIG. 2B*

RESOURCE MANAGEMENT FOR LOGICAL AND PHYSICAL AVAILABILITY ZONES OF A PROVIDER NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality may allow customers to group together different accounts as part of single larger account for the provider network. In this way various different teams, organizations, or groups that are part of a larger organization, such as different development teams, may be able to respectively manage and control provider resources in order to pursue their own purposes effectively. However, as the larger organization attempts to leverage different volume discounts, capacity reservation schemes, and other purchase plans for computing resources, it may be difficult to take advantage of these pricing benefits. Moreover, operators of provider networks themselves may confront challenges when managing the resources for these groups in a way that aligns the costs of providing computing resources with revenues generated from the various groups within larger account for the provider network.

BRIEF DESCRIPTION OF THE DRAWINGS

FIGS. 2A and 2B are examples of consolidated billing based on logical or physical availability zones, according to some embodiments.

Figure 1A:
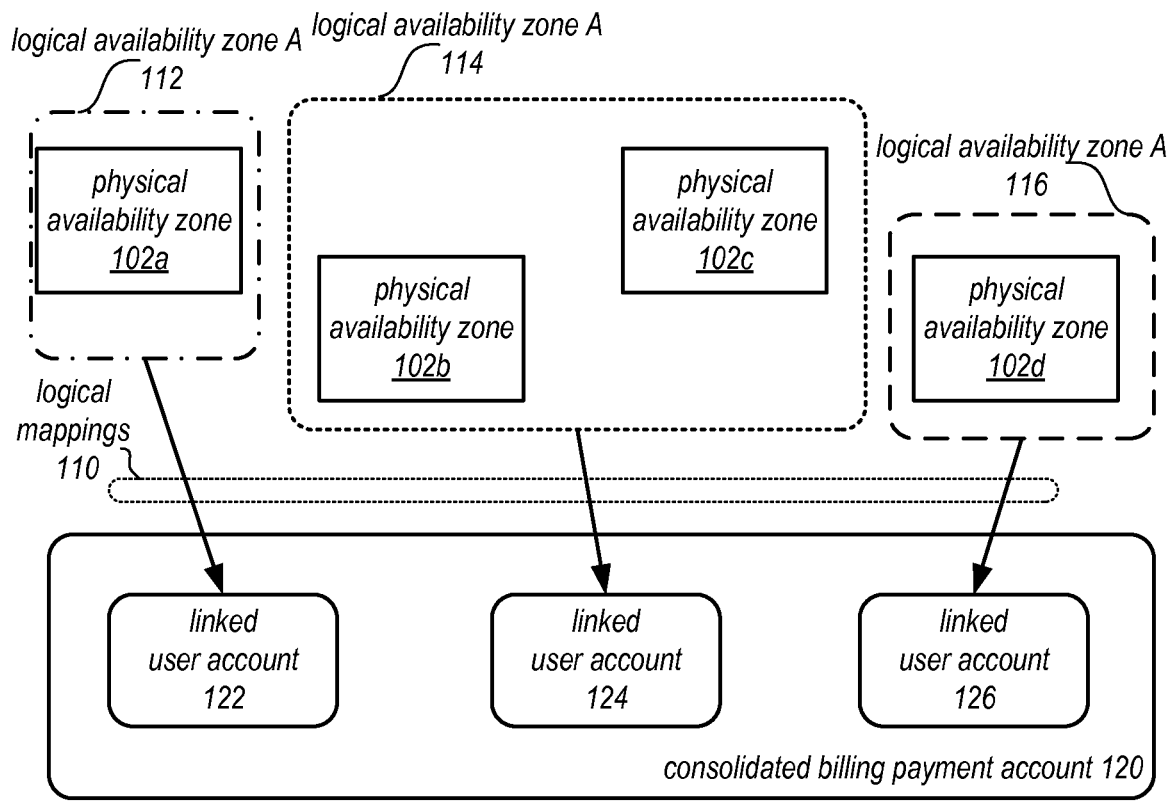
FIGS. 1A and 1B are diagrams illustrating logical and physical availability zones for a provider network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement resource management and billing for logical and physical availability zones of provider networks, according to some embodiments. Provider networks may provide computing resources to clients, users, or other type of customers, such as in the form of compute instances (e.g., a virtual machine acting as a distinct logical computing system that provides users with the illusion that they are the sole operators and administrators of a given hardware computing resource). Clients may reserve (i.e., purchase or buy) a capacity reservation for a computing resource for a specified length of time and may reserve a specific configuration of the computing resource. For example, virtual compute instances may be configured in many different ways, such as based on performance characteristics (e.g., utilization, size, capacity, etc. . . . ) or the length of time desired. In some embodiments, reserved computing resources, may always be available to a client, and thus reserved for the client's use. Thus, clients may be able to procure computing resources according to their determined needs.

Clients who consume computing resources of a provider network may take advantage of the flexibility with which new resources can be required. Resources can be quickly scaled to meet demand, such as for a client implementing a fast-growing web service. For example, in some embodiments reserved virtual compute instances may be purchased for a period of time (term length) to operate the web service, with additional reserved virtual compute instances purchased as needed (e.g., as demand increases).

Some client's needs may differ across large groups, entities, or organizations that perform or implement many different functions by consuming computing resources of a provider network. For example, different teams within a company may operate as independent cost centers for a company (e.g., production and development) and thus the company may setup different user accounts at the provider network associated with the different cost centers. However, it may still be useful or more efficient from a billing perspective for the customer as a whole to receive a single bill, while still being able to track the usage and costs of each account individual. Similarly, different customers (e.g., different companies) may wish to combine different accounts together as part of some joint venture, project, or operation. Thus, in various embodiments a consolidated billing technique may be applied to the computing resource consumption for the user accounts that are linked together (e.g., to one or more payment accounts) that may allow for the combined consumption of user accounts to be determined for a single bill or payment (as well as illustrating various line items for each account's consumption). Moreover, volume discounts, capacity reservations, and other benefits, such as various pricing benefits, may be applied to the consumption of the group of accounts as a whole.

In order to provide computing resources, operators of provider networks may implement multiple different data centers containing the various computing systems and devices capable of providing computing resources to clients of a provider network. In some embodiments, data centers may be divided up into different physical availability zones. In some embodiments, physical availability zones may map to a single data center, while in other embodiments multiple data centers may map to a single physical availability zone that may be considered to have correlated failure characteristics (e.g., rely upon the same power source). Generally, a physical availability zone may be a fault tolerant zone, such that failures in one physical availability zone may not affect the operation of another physical availability zone. For example, if physical availability zone A suffers a power failure, physical availability zone B may still operate as the power source of physical availability zone B may be different (limiting the failure or fault scope to physical availability zone A).

Figure 1B:
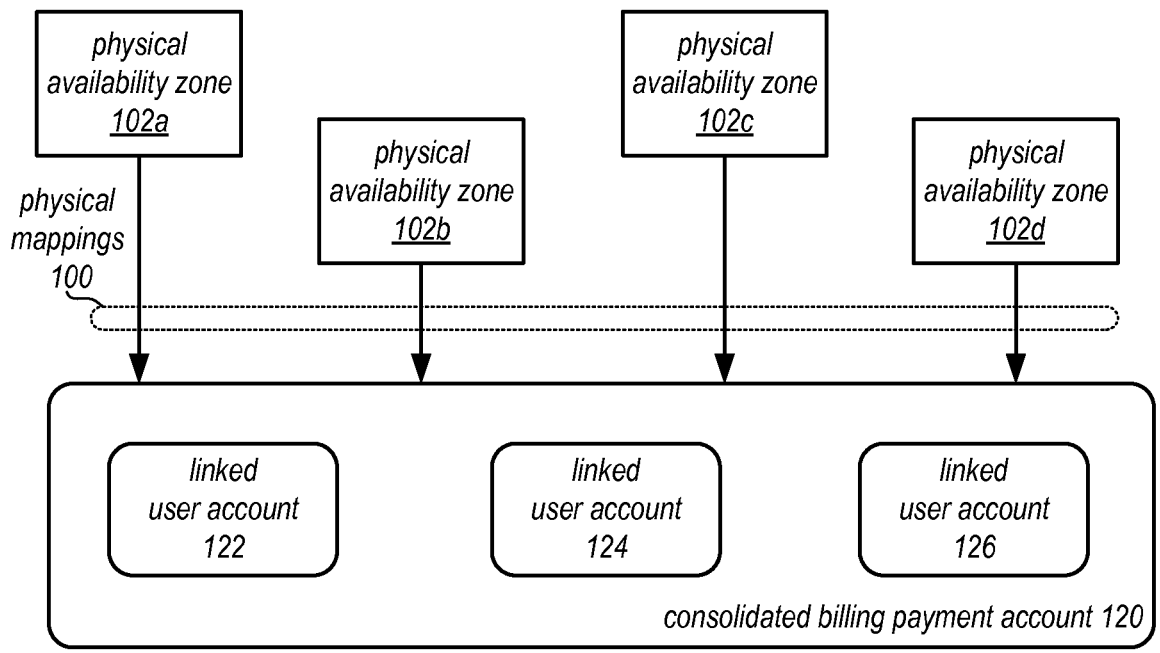

In some embodiments, it may be desirable for operators of a provider network not to expose the physical availability zone infrastructure to clients (e.g., the exact number of data centers or physical availability zones). Thus, logical availability zones may be implemented. Logical availability zones may provide mappings for a respective user account of a provider network to physical availability zones, which may different from one user account to another (even linked user accounts). When performing consolidated billing for multiple user accounts, as discussed above, how particular user accounts are mapped from logical availability zones assigned to the user account to physical availability zones may affect how computing resources are managed and billed. FIGS. 1A and 1B are diagrams illustrating logical and physical availability zones for a provider network, according to some embodiments.

As illustrated in FIG. 1A, a provider network may implement multiple physical availability zones, such as physical availability zones 102*a*, 102*b*, 102*c* and 102*d*. These physical availability zones 102 may provide computing resources for consumption for linked user accounts 122, 124 and 126. Linked user accounts 122, 124 and 126 may be linked together as part of a consolidated billing payment account 120, for which the consumption of computing resources of the individual linked accounts 122, 124 and 126 is aggregated together.

For each linked user account, a respective logical availability zone may be assigned. The logical availability zone may appear from the perspective of clients/customers using the user accounts 122, 124 and 126 to be the same. For instance, the logical availability zone 112 for linked user account 122 is labeled logical availability zone A, though the logical mapping 110 between linked user account 122 from logical availability zone A 112 points to physical availability zone 102. For linked user account 124, logical availability zone A 114 is logically mapped 100 to physical availability zones 102*a* and 102*c*. Similarly, for linked user account 126, logical availability zone A 116 is logically mapped 100 to physical availability zone 102*d*. Thus, utilizing logical mappings, a provider network may diversify and obscure the consumption for clients across different physical availability zones, even though the user accounts themselves may have all elected to consume resources in "logical availability zone A." Although not illustrated in FIG. 1A, in at least some embodiments the number of logical availability zones may equal the number of physical availability zones. Thus, for instance, each linked user account 122, 124 and 126 may have 4 respective logical availability zones (A, B, C and D), even though they may be differently mapped to the physical availability zones 102*a*, 102*b*, 102*c* and 102*d*.

Various different pricing benefits and/or resource management schemes may be tied to the logical availability zones provided to linked user accounts 122, 124 and 126. As mentioned above, a consolidated billing technique may be applied to aggregate the usage of these linked user accounts for a single consolidated billing payment account 120. Moreover, volume or resource capacity reservation discounts may be applied for resources that are consumed in the same logical availability zone. For example, FIG. 2A illustrates and example of consolidated usage (or consumption) for linked user accounts 122, 124 and 126. The usage (which may be in hours, dollars or some other metric) for linked user account 122 is 101. Similarly, the usage for linked user accounts 124 and 126 may be 78 and 24 respectively. The total usage for payment account 120 is 203. Various different billing, pricing benefit or other purchasing/discount schemes may be applied to the total aggregate usage for the logical availability zone A.

For example, in various embodiments, reserved computing resources may be purchased prior to use for a particular linked user account (e.g., 122), for which only some are used. If, for instance, a computing resource reservation of 120 hours was purchased and reserved for linked user account 122, there is a remainder of 19 hours. For linked user accounts implementing a consolidated billing technique, the remaining 19 hours may be applied to usage (or consumption) of other linked user accounts 124 and 126 (for example applying the 19 hours to cover some of the 78 hours for linked user account 124 (e.g., 10 hours) and/or some of the 24 hours for linked user account 126 (e.g., 9 hours). Thus any pricing benefits, such as reduced consumption rates conveyed from pre-purchasing the reserved computing resources may be also consumed by other linked user accounts.

In various embodiments, multiple logical availability zones may be mapped to each linked user account. However, if known resource capacity reservations or other pricing benefits are available based on consumption located in a particular availability zone, then clients may choose to launch, provision, or otherwise consume computing resources in those logical availability zones where the benefits may be applied. Consider the example above. A client or customer directing the consumption of resources for linked user account 124 may be aware of the reserved resource capacity purchased for linked user account 122 and may choose to consume resources in logical availability zone A 114 in order to take advantage of the known purchased capacity. Thus, in various embodiments, a billing setting for the consolidated billing payment account 120 may be set to logical availability zone billing in order to apply a consolidated billing technique for aggregate usage in a logical availability zone.

For some groups of linked user accounts, having direct knowledge and mapping to physical availability zones may be desirable. For example, the linked user accounts of a consolidated billing payment account may wish to ensure that certain computing resources consumed for the different accounts are implemented in the same or different physical locations (e.g., to maximize fault tolerance). Moreover, if one user account has purchased capacity reservations in one logical availability zone (e.g., user account 122 in logical availability zone A 112) and another user mapped wants to take advantage of the capacity reservation in the logical availability zone but cannot because physical availability zones mapped to the logical availability zone are different and do not currently have capacity or is constrained (e.g., user account 126 wants to launch resources in logical availability zone A 116 but cannot because physical availability zone 102d is currently fully utilized), then it may be desirable for a user account to consume resources in the physical availability zone for which the excess reserved resource capacity is availability (e.g., allow user account 126 to consume resources directly in physical availability zone 102a). Thus, in various embodiments, a provider network may provide physical mappings 100 to linked user accounts 122, 124 and 126 of consolidated billing payment account 120, as illustrated in FIG. 1B.

For example, FIG. 1B illustrates that via physical mappings 100, linked user accounts 122, 124 and 126 may each directly communicate with and consume resources of each of the physical availability zones 102a, 102b, 102c and 102d. Thus, as described in the example above, computing resources provided by physical availability zone 102a may be consumed by linked user account 126 via physical mappings 100. In some embodiments, the number of physical availability zones mapped to linked user accounts may be a subset of the total number of physical availability zones of a provider network.

As with logical availability zones above, a billing setting for consolidated billing payment account 120 may be set to physical availability zone billing, thus aggregating usage for the linked user accounts 122, 124 and 126 according to physical availability zone. FIG. 2B provides an example of aggregated usage for linked user accounts of a consolidated billing payment account, according to some embodiments. For physical availability zone 102a, both linked user account 122 and linked user account 126 consumed computing resources for 101 and 20 hours respectively, for a total of 121 hours. For physical availability zone 102b, both linked user account 122 and linked user account 124 consumed computing resources for 19 and 36 hours respectively, for a total of 55 hours. For physical availability zone 102c, both linked user account 124 and linked user account 126 consumed computing resources for 42 and 32 hours respectively, for a total of 74 hours. For physical availability zone 102d, both linked user account 124 and linked user account 126 consumed computing resources for 10 and 24 hours respectively, for a total of 34 hours. Various different billing, pricing benefit or other purchasing/discount schemes may be applied to the total aggregate usage for each of the physical availability zones 102a 102b, 102c and 102d. For example, if linked user account 126 reserved 40 hours of computing resources for physical availability zone 102, then the remaining 16 hours would cover all 10 hours of linked user account 124's usage.

In addition to providing each linked user account with direct access to physical availability zones for billing or pricing purposes, physical mappings may allow each linked account user of a consolidated billing payment account to take advantage of a capacity reservation for a specific physical availability zone, in some embodiments. For example, a capacity reservation for computing resources may be purchased for a specific physical availability zone. A resource management or other system or component of a provider network may maintain capacity at the physical availability zone so that the reserved computing resources may be consumed whenever desired by a linked user account. For example, in some embodiments, linked user account 122 may purchase a capacity reservation for physical availability zone 102a, and linked user account 126 may launch a computing resource in physical availability zone 102a. If physical availability zone 102a was otherwise full or unable to launch any new computing resources, linked user account 126 may still be allowed to use the reserved capacity purchased for linked user account 122 (if linked user account 122 or linked user account 124 are not consuming it). By tying capacity reservations for computing resources directly to a physical availability zone, no double booking or other capacity inefficiencies may occur than if the capacity reservation was tied to a logical availability zone (as resources would have to be held in reserve at each physical availability zone mapped to that logical availability zone for different linked user accounts).

Please note that previous descriptions are not intended to be limiting, but are merely provided as an example of implementing resource management and billing for logical and physical availability zones of a provider network. Multiple different configurations and implementations of logical availability zones and physical availability zones may exist, as well as various different usages of the logical and physical availability zones may be performed by linked user accounts. Thus, the previously described figures are not intended to be limiting.

This specification begins with a general description of a provider network, which may offer computing resources for consumption to various client and which may implement resource management and billing for logical and physical availability zones. Then various examples of a provider network are discussed, including different components/modules, or arrangements of components/module that may be employed as part of implementing a provider network. A number of different methods and techniques to implement resource management and billing for logical and physical availability zones of a provider network are then discussed, some of which are illustrated in accompanying flowcharts. Finally, a description of an example computing system upon which the various components, modules, systems, devices, and/or nodes may be implemented is provided. Various examples are provided throughout the specification.

Figure 3:
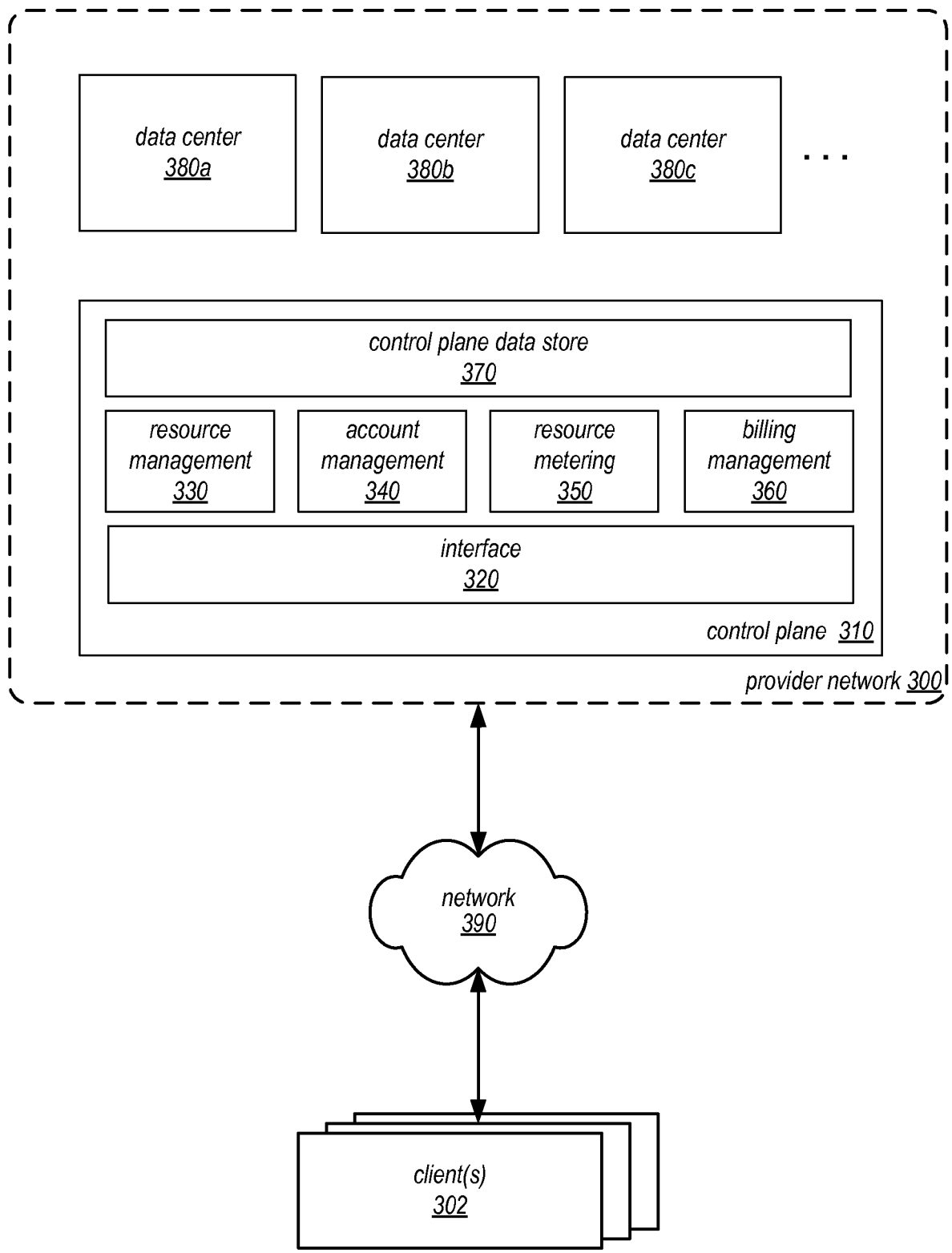
FIG. 3 is a block diagram illustrating a provider network offering computing resources that implement resource management and billing for logical and physical availability zones of the provider network, according to some embodiments.

FIG. 3 is a block diagram illustrating a provider network offering computing resources that implement resource management and billing for logical and physical availability zones of the provider network, according to some embodiments. Provider network 300 may be a provider network set up by an entity such as a company or a public sector organization to provide one or more network-based services (such as various types of cloud-based computing or storage) accessible via the Internet and/or other networks to clients. Such a provider network may include numerous data centers hosting various resource pools, such as collections of physical and/or virtualized computer servers, storage devices, networking equipment and the like, needed to implement and distribute the infrastructure and services offered by provider network 200. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the computing resources of the provider network in different embodiments, including general purpose or special purpose computer servers, storage devices, network devices and the like. In some embodiments clients 302 or user may be provided direct access to a computing resource, e.g., by giving a user an administrator login and password. Compute resources may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 302 applications, without for example requiring the client 302 to access a computing resource. Computing resources may be implemented as providing specialized functions or services, such as database services, caching services, networking services, or any other type of computing resource. Although computing resources are often described as compute instances in various examples below, computing resources are not limited to such and may be implemented and consumed in a variety of other ways and for other purposes.

As illustrated in FIG. 3, data centers 380*a*, 380*b* and 380*c* may represent various numbers of data centers that implement provider network 300 and provide computing resources for consumption by clients 302. Computing resources may be offered as part of one or many different network-based services (e.g., storage services, database services or computational services). As discussed above with regard to FIGS. 1A and 1B, data centers 380 may be mapped to different physical availability zones. In some embodiments, physical availability zones (which correspond to one to one mappings, or one to many mappings dependent on whether a data centers 380 in a respective physical availability zone may be considered to have correlated failure characteristics). Generally, as stated previously, a physical availability zone may be a fault tolerant zone, such that failures in one physical availability zone may not affect the operation of another physical availability zone.

Figure 6:
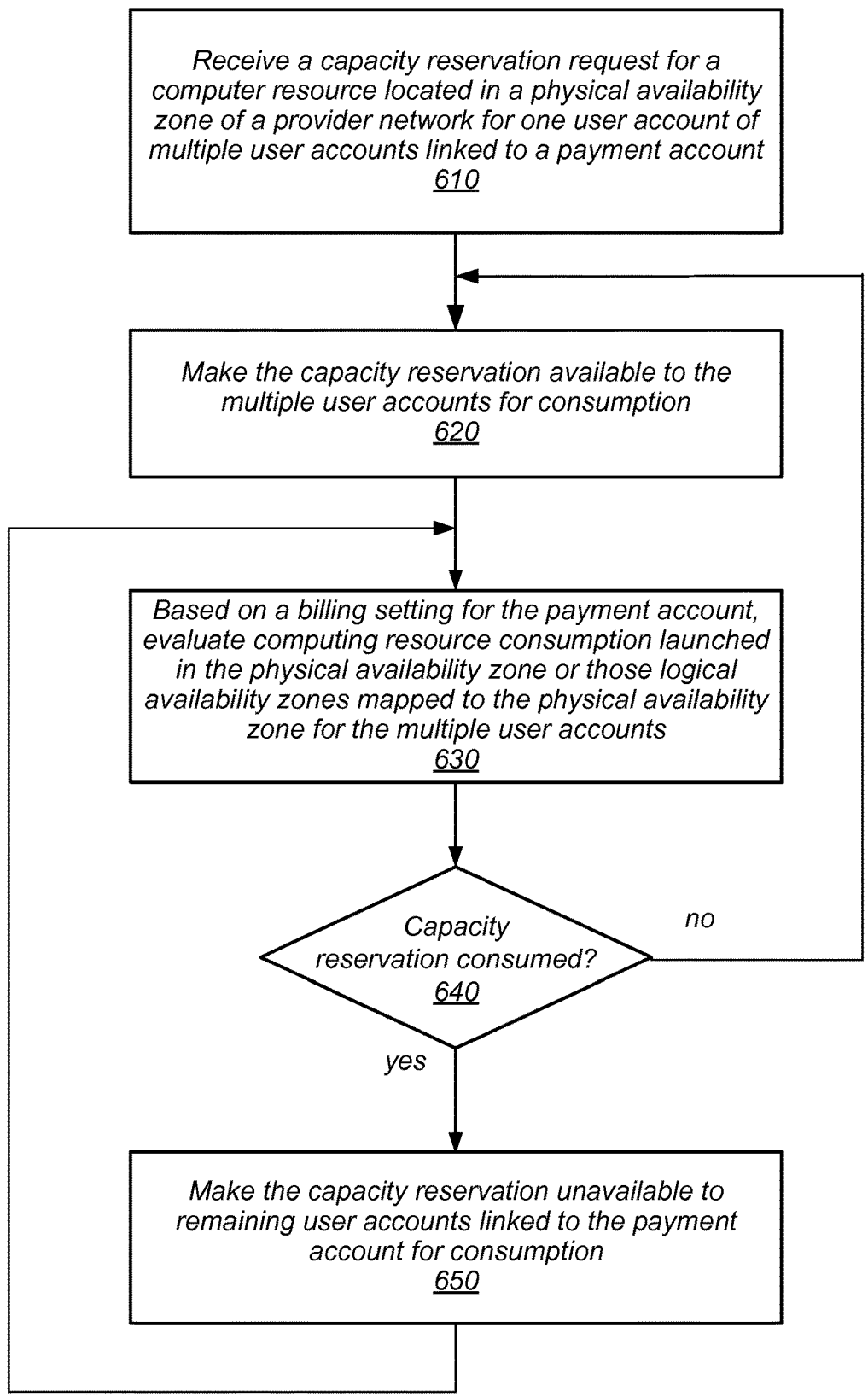
FIG. 6 is a high-level flowchart illustrating various methods and techniques for managing capacity reservations for computing resources in logical and physical availability zones of the provider network, according to some embodiments.
Figure 7:
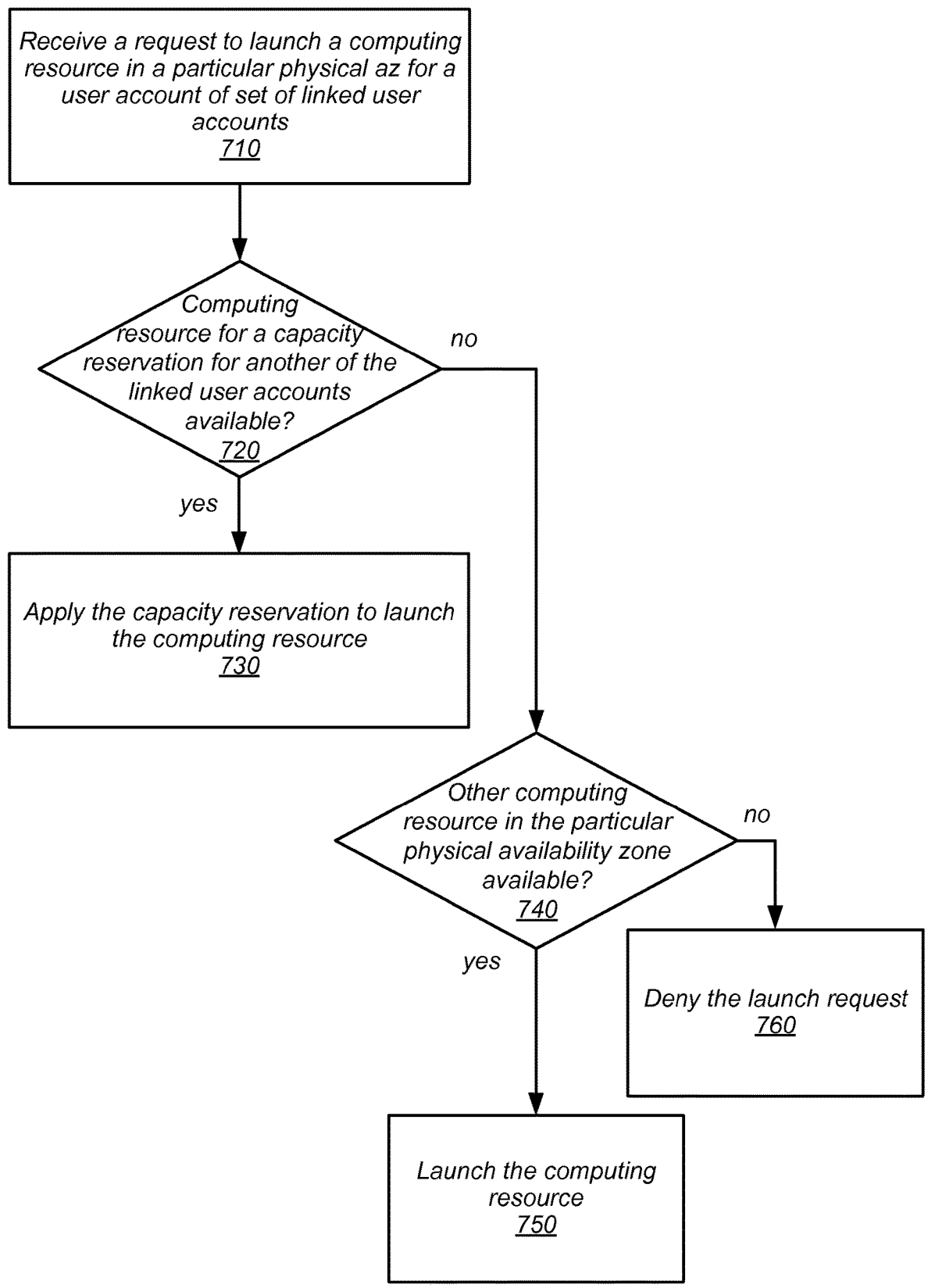
FIG. 7 is high-level flowchart illustrating various methods and techniques for launching a computing resource in a particular physical availability zone, according to some embodiments.
Figure 8:
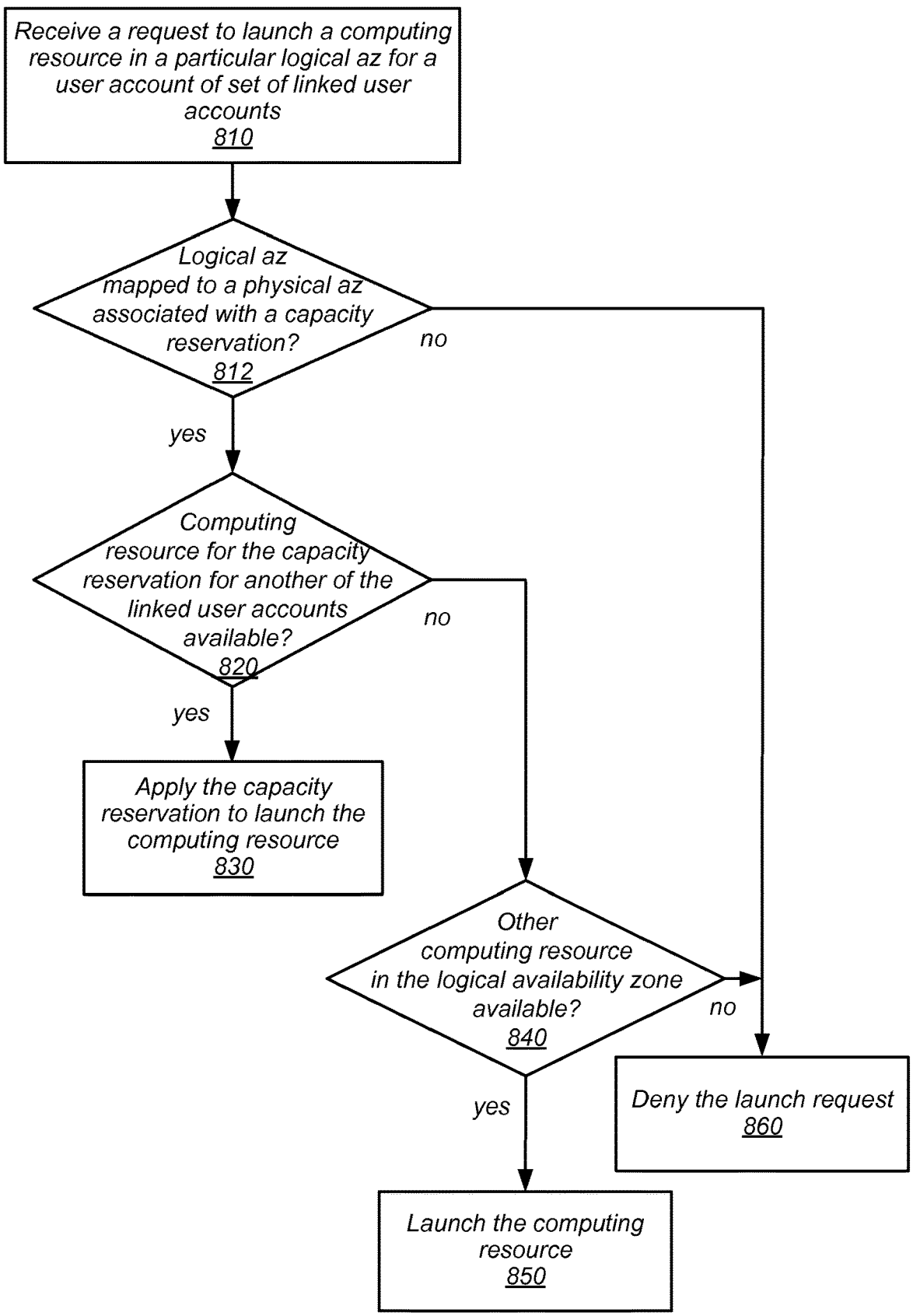
FIG. 8 is high-level flowchart illustrating various methods and techniques for launching a computing resource in a particular logical availability zone, according to some embodiments.

In various embodiments, computing resources may be compute instances. There may be many different types or configurations of compute instances based on several different dimensions in some embodiments, (and pricing policies associated with different classes may differ. Compute instances, in some embodiments, may be classified based in part on the timing or duration of instance allocations—i.e., on when instances are obtained by clients and when they are released by the clients, such as reserved instances, on-demand instances and spot-instances. Each of these different classifications may have different respective pricing policies. In some embodiments, reserved compute instances may be reserved for fairly long periods, such as a one-year term or a three-year term in accordance with the pricing policy, by paying a low, one-time, upfront payment for the instance, and then paying a low hourly rate for actual use of the instance at any desired times during the term of the reservation. Thus, a reserved compute instance may apply both a particular pricing benefit and a capacity reservation for the resource. A client 302 that reserved a reserved instance may, by making the long-term reservation, be assured that its reserved instance will be available whenever it is needed. For consolidated billing accounts, any linked user may be assured to launch the reserved compute instance, as long as it may be launched in the same physical availability zone (and is not consumed by another linked user account). FIGS. 6-8 discussed below provide further detail on determining whether a user account's request to launch a resource may apply to a capacity reservation like a reserved instance For those clients 302 that do not wish to make a long-term reservation, (or for those accounts where all of the previously purchased computing resources or instances are consumed, such as by other linked user accounts) the client may instead opt to use on-demand instances (or spot instances). The pricing policy for on-demand instances may allow the client 302 to pay for resource capacity by the hour with no long-term commitment or upfront payments. The client 302 may decrease or increase the resource capacity used, based on application needs, and may only have to pay the hourly rate for the instances used. In some cases the per-hour pricing for on-demand instances may be higher than the hourly rate for reserved compute instances, because the relatively long durations of reservations may provide a more stable revenue stream to the operator of the provider network than the potentially more dynamic revenue stream provided by on-demand instances. Thus, as discussed above with regard to FIGS. 2A and 2B, those unconsumed capacity reservations may apply reserved instance rates to the consumption of other linked user accounts that did not purchase the capacity reservations, while the remaining hours not covered by leftover capacity may be subject to on-demand rates.

Spot instances may provide a third type of resource purchasing and allocation model. A spot pricing policy may allow a client 302 to specify the maximum hourly price that the client 302 is willing to pay, and the resource management module 330 may set a spot price for a given set of available compute resources dynamically based on the prices clients are willing to pay and on the number of instances available to support the spot model. If a client's 302 bid meets or exceeds the current spot price, an instance may be allocated to the client 302. If the spot price rises beyond the bid of the client 302 using a spot instance, access to the instance by the client 302 may be revoked (e.g., the instance may be shut down).

In some embodiments, compute instances have different types or configurations based on expected uptime ratios. The uptime ratio of a particular reserved compute instance may be defined as the ratio of the amount of time the instance is activated, to the total amount of time for which the instance is reserved. Uptime ratios may also be referred to as utilizations in some implementations. If a client expects to use a reserved compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. The previous descriptions is not intended to be limiting, but merely illustrative of the many different configurations possible for a compute instance or other computing resource provided by provider network 300.

In various embodiments, provider network 300 may implement a control plane 310 in order to manage the computing resource offerings provided to clients 302 by provider network 300. Control plane 310 may implement various different components to manage the computing resource offerings. Control plane 310 may be implemented across a variety of servers, nodes, or other computing systems or devices (such as computing system 1000 described below with regard to FIG. 9). It is noted that where one or more instances of a given component may exist, reference to that component herein may be made in either the singular or the plural. However, usage of either form is not intended to preclude the other.

In at least some embodiments, control plane 310 may implement interface 320. Interface 320 may be configured to process incoming requests received via network 390 and direct them to the appropriate component for further processing. In at least some embodiments, interface 320 may be a network-based interface and may be implemented as a graphical interface (e.g., as part of an administration control panel or web site) and/or as a programmatic interface (e.g., handling various Application Programming Interface (API) commands). In various embodiments, interface 310 may be implemented as part of a front end module or component dispatching requests to the various other components, such as resource management 330, account management 340, resource metering 350, and billing 350. Clients 302 may, in various embodiments, may not directly provision, launch or configure resources but may send requests to control plane 310 such that the illustrated components (or other components, functions or services not illustrated) may perform the requested actions.

Figure 4:
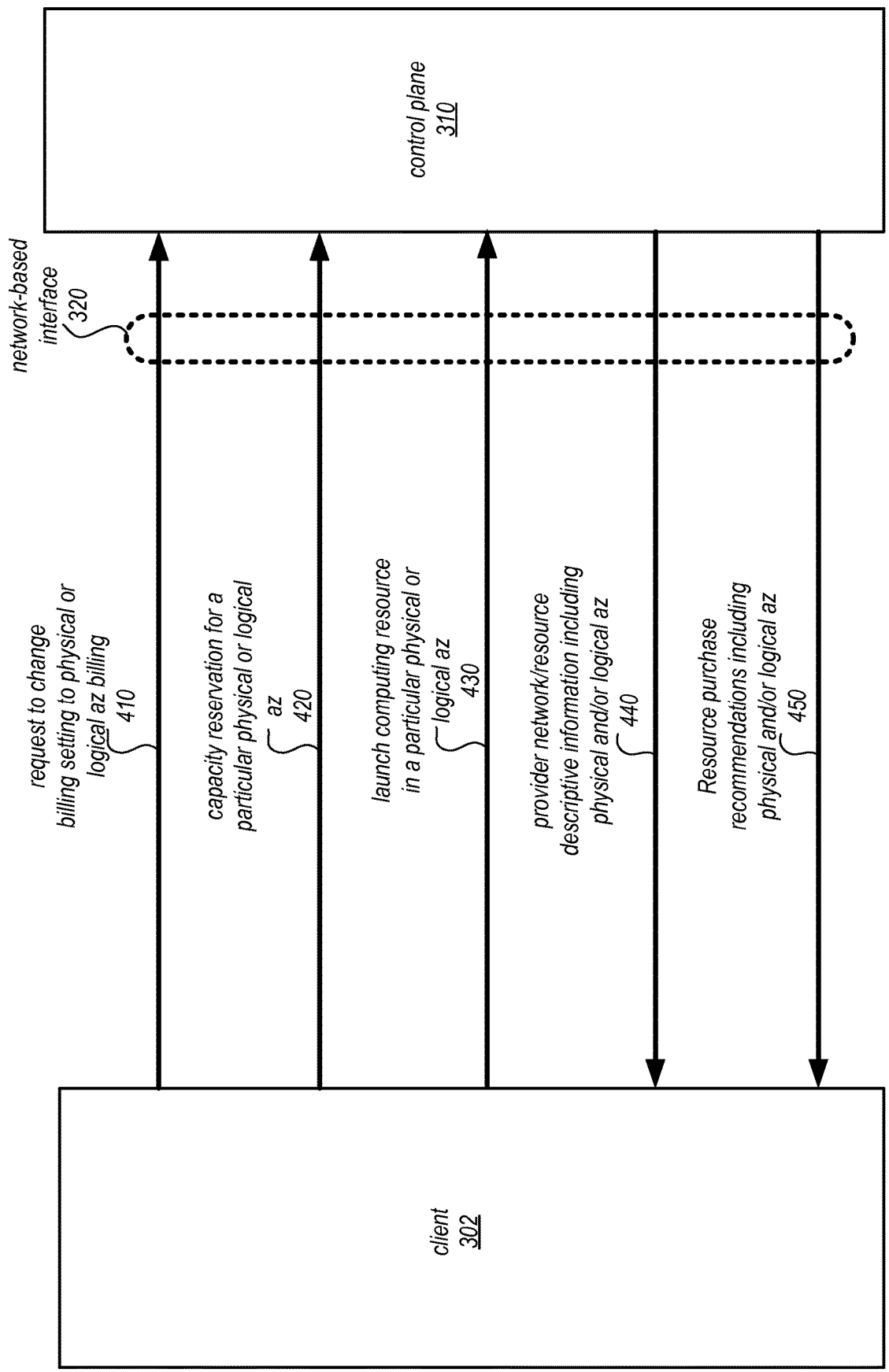
FIG. 4 is a block diagram illustrating interactions between a client and a control plane for a provider network that offers computing resources to the client located in physical and logical availability zones for the provider network, according to some embodiments.

FIG. 4 is a block diagram illustrating interactions between a client and a control plane for a provider network that offers computing resources to the client located in physical and logical availability zones for the provider network, according to some embodiments, many of which may be received and sent via interface 320. For example, in some embodiments, client 302 may submit a request to change a billing setting for a payment account for multiple linked user accounts 410 to either logical availability zone billing or physical availability zone billing via network-based interface 320. In some embodiments, requests to change a billing setting may be restricted to clients 302 associated with a payment account for linked user accounts. If, for example two different payment accounts for different customers (e.g., two different companies) have payment accounts linked to the multiple user accounts, either of the two payment accounts may be able to change the billing setting.

In some embodiments, capacity reservations for a particular physical or logical availability zone 420 may be made via network-based interface 320 to control plane 310. In some embodiments, capacity reservations 420 may be made as a purchase transaction either for computing resource (e.g., reserved compute instance) offered directly by provider network 300 or for resale as part of a resale marketplace offering reserved compute instances for other user accounts. The capacity reservation may indicate the various configuration, time period, or other information necessary to reserve the appropriate computing resource.

In some embodiments, a request to launch a particular computing resource in a particular physical or logical availability zone 430 may be received via network-based interface 320 at control plane 310. For example, a request for a linked user account to launch a resource may be received that consumes a capacity reservation made by another user account in a particular physical availability zone. The launch request 430 may include the various configuration, location, and/or other information necessary to launch a particular computing resource (such as a computing resource matching a particular capacity reservation for a computing resource).

In some embodiments, clients 302 may request and receive back various provider network/resource descriptive information that includes the physical availability zone and logical availability zone mapping for a particular user account. For a linked user account, the logical availability zone mapping may be different than for another linked user account to the same payment account, though the physical availability zone mappings may be the same. Any information for which an availability zone or location is requested may include a physical availability zone and a logical availability zone, in some embodiments. Note, that in some embodiments, physical availability zone names may be formatted in such a way that the various components of control plane 310 may be able to differentiate between a physical availability zone and logical availability zone (e.g., by adding a -p to an availability zone name). In some embodiments, information for a particular physical availability zone may be made known or displayed to all affected customers (e.g., a public information posting).

In some embodiments, clients 302 may receive computing resource purchase recommendations including the respective physical and/or logical availability zone 450. For example, control plane 310 may implement a cost optimization and/or recommendation component that provides purchase or consumption recommendations to a client for a particular user account. If the user account is one of a group of linked user linked together, the recommendations may be provided based on the billing setting. Thus, if the billing setting is set to physical availability zone billing, then the recommendations may be determined upon which physical availability zones would offer a cost effective purchase and/or consumption of computing resources for the linked user account.

Although not illustrated, various other types of interactions with network-based interface 310 may occur. In some embodiments, physical availability zone descriptors or names and logical availability zone descriptors or names may be used interchangeably, as control plane 310 may be able to identify the different types of availability zone. Thus, the previous examples are not intended to be limiting.

Turning back to FIG. 3, control plane 310 may also implement account management module 340. Account management module 340 may be configured to manage account settings for user accounts, such as linked user accounts linked together (possibly to one or more payment accounts). In at least some embodiments, user account management module 340 may be configured to handle requests to switch between different billing settings for the linked user accounts, from logical availability zone billing to physical availability zone billing and from physical availability zone billing to logical availability zone billing. In at least some embodiments, account management module may manage or update a data structure or records in control plane data store 370 which indicates the billing setting for the linked user accounts (along with various other user account information). For example, account management module may implement a billing tree which indicates some properties like billing setting which apply to each linked user account in the billing tree. In some embodiments, account management module 340 may be configured to handle requests to add and remove user accounts to a particular billing tree (e.g., for a payment account) or other type of data structure, linking or unlinking the user accounts to the group properties like billing setting. Account management module 340 may, in some embodiments, delay the effect of a billing setting change until a particular time (e.g., beginning of next logical hour) so as not to disrupt any other metering or billing processes that are being performed.

Control plane 310 may implement resource management module 330 to manage the access to, capacity of, mappings to, and other control or direction of computing resources offered by provider network. In at least some embodiments, resource management module 330 may provide both a direct sell and 3$^{rd}$ party resell market for capacity reservations (e.g., reserved compute instances). For example, resource management module 330 may allow clients 302 via interface 320 to learn about, select, purchase access to, and/or reserve capacity for computing resources, either from an initial sale marketplace or a resale marketplace, via a web page or via an API. Resource management 330 may also offer a implement a flexible set of resource reservation, control and access interfaces for clients 302 via interface 320. For example resource management module 330 may provide credentials or permissions to clients 302 such that compute instance control operations/interactions between clients and in-use computing resources may be performed.

Resource management module 330 may be implemented to handle resource reconfigurations, or client purchase recommendations (which may be optimized based on the billing setting for payment account). Resource management module 330 may also handle the various pricing schemes (at least for the initial sale marketplace) in various embodiments. For example provider network 300 may support several different purchasing modes (which may also be referred to herein as reservation modes) in some embodiments: for example, term reservations (i.e. reserved compute instances), on-demand resource allocation, or spot-price-based resource allocation. Using the long-term reservation mode, a client may make a low, one-time, upfront payment for a compute instance or other computing resource, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of compute instance or other computing resource, and if the client's maximum price exceeded a dynamic spot price determined at least in part by supply and demand, that type of resource would be provided to the client.

During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource management module 330 and may be allocated to some other client that is willing to pay a higher price. Resource capacity reservations may also update control plane data store 370 to reflect changes in ownership, client use, client accounts, or other resource information.

When managing capacity reservations for user accounts linked to a payment account, resource management module may be configured to perform the various techniques described below with regard to FIGS. 6-8. For example, when capacity reservations are received for a one user account of multiple user accounts linked together (e.g., for a particular reserved compute instance in a particular physical availability zone or logical availability zone), resource management module 330 may be configured to make the capacity reservations available to each of the user accounts linked to the payment account. If, after evaluating the resource consumption of the linked user accounts at the physical availability zone (and/or logical availability zone mapped to the physical availability zone) of a particular capacity reservation and determining that the reservation is consumed, then the reservation may no longer be made available to remaining user accounts linked to the payment account. Similarly, requests to launch computing resources from linked user accounts may be evaluated to determine whether a capacity reservation is still available to be used and applied to the launch request. In this way, if computing resources are stopped, started, fail, or otherwise change from being consumed to not being consumed, the capacity reservation may be updated to reflect whether or not resources reserved as part of the reservation are available to be consumed. In various embodiments, resource management module 330 may receive consumption information from resource metering module 350.

Although not illustrated, in some embodiments, resource management module 330 may provide recommendations for client reservation or consumption of computing resources (e.g., reserved compute instances in the resale marketplace and/or the initial sale marketplace) according to an optimization goal. For example a client optimization goal may be lowest price with particular performance requirements. Client recommendations, for example, may be determined to recommend a reserved compute instance resale listing that may satisfy the optimization goal and/or a particular configuration for a compute instance. Recommendations for computing resources may be made to clients based on various information about the client, such as client usage or consumption data. For clients that are associated with a user account that is linked to other user accounts, resource management module 330 may look for optimizations and recommendations based on a billing setting for the payment account (e.g., provide listings in particular physical availability zone). Various types of usage data sources from which may be employed in different embodiments. In some embodiments, where for example a client already consumes some set of computing resources of the provider network, provider-side metrics agents deployed at various entities (such as resources, network devices and the like) within the provider network may serve as usage data sources for purchase recommendations. The types of usage information collected for a given resource or instance may include, for example, uptime (i.e., the amount of time a resource instance was active or booted up), CPU utilization, memory utilization, I/O rates, I/O device utilization, network traffic rates, network device utilization, the operating system in use, the hypervisor in use, various details of the software stack in use such as application server type and version, and so on, depending on the type of resource. Some or all of these may be used to generate client recommendations, in various embodiments.

In various embodiments, control plane 310 may implement resource metering module 350. Metering module 350 may track the consumption of various computing resources consumed for different clients or user accounts. For user accounts linked to a single payment account, metering module 350 may be configured to aggregate usage or consumption according to particular billing setting for the payment account (e.g., logical or physical availability zone). In at least some embodiments, resource metering module 350 may include various information fields about the consumed resources, including both the physical availability zone the computing resource is located in, and as well as the logical availability zone for the particular user account that is consuming the computing resource in a metering record. In some embodiments, resource metering module 350 may inject into the availability zone field either the logical or physical availability zone based on the billing setting for the user account (e.g., logical for logical billing or physical or physical billing) and feed the metering record with the injected information to other components, such as billing management module 360.

In various embodiments, control plane 310 may implement billing management module 360. Billing management module 360 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts. Billing management module 360 may be configured to access account information (e.g., the billing tree) for a payment account and determine the billing setting.

If the billing setting is set for logical availability zone billing, then billing management module may be configured to apply a consolidated billing technique that aggregates usage for the linked accounts according to individual logical availability zones (as illustrated in FIG. 2A above). Then a capacity reservation billing scheme (such as apply a special rate for usage that is performed by reserved computing resources) may be applied to the aggregated usage for each logical availability zone. Thus, reserved capacity for that particular logical availability zone may be applied to usage in that particular logical availability zone (which may be equivalent to the same type of resource reserved). If other remaining usage is not eligible for the special rate for reserved computing resources (either as insufficient capacity reservations or different types of resources were consumed), then other billing schemes may apply (on demand or spot-pricing—if the computing resource was procured via the spot market). Various volume discounts and/or any other pricing schemes or benefits may also be applied. The totals for each logical availability zone may then be used to generate a single bill for the payment account, in some embodiments.

If the billing setting is set for physical availability zone billing, then billing management module may be configured to apply a consolidated billing technique that aggregates usage for the linked accounts according to individual physical availability zones (as illustrated in FIG. 2B above). Then a capacity reservation billing scheme (such as apply a special rate for usage that is performed by reserved computing resources) may be applied to the aggregated usage for each physical availability zone. Thus, reserved capacity for that particular physical availability zone may be applied to usage in that particular physical availability zone (which may be equivalent to the same type of resource reserved). If other remaining usage is not eligible for the special rate for reserved computing resources (either as insufficient capacity reservations or different types of resources were consumed), then other billing schemes may apply (on demand or spot-pricing—if the computing resource was procured via the spot market). Various volume discounts and/or any other pricing schemes or benefits may also be applied. The totals for each physical availability zone may then be used to generate a single bill for the payment account, in some embodiments.

Clients 302 may encompass any type of client configurable to submit requests to provider network 300. Clients 302 may submit credentials, login, or otherwise authenticate an identity or association with a particular user account or payment account. Clients may submit various types of requests, such as those discussed above with regard to FIG. 4, including billing setting changes, capacity reservation interactions, launching computing resources and/or control plane or computing resource interactions. For example, a given client 302 may include a suitable version of a web browser, or may include a plug-in module or other type of code module configured to execute as an extension to or within an execution environment provided by a web browser. Alternatively, a client 302 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 302 may be configured to generate network-based services requests according to a Representational State Transfer (REST)-style network-based services architecture, a document- or message-based network-based services architecture, or another suitable network-based services architecture.

In some embodiments, a client 302 (e.g., a computational client) may be configured to provide access to a computing resource in a manner that is transparent to applications implemented on the client 302 consuming computational resources provided by the computing resource. In such an embodiment, applications may not need to be modified to make use of the service model of FIG. 2. Instead, the details of interfacing to provider network 300 may be coordinated by client 302 and the operating system or file system on behalf of applications executing within the operating system environment at a client 302.

Clients 302 may convey network-based services requests to provider network 300 via a network 390. In various embodiments, a network 390 may encompass any suitable combination of networking hardware and protocols necessary to establish network-based communications between clients 302 and provider network 300. For example, a network 390 may generally encompass the various telecommunications networks and service providers that collectively implement the Internet. A network 390 may also include private networks such as local area networks (LANs) or wide area networks (WANs) as well as public or private wireless networks. For example, both a given client 302 and provider network 300 may be respectively provisioned within enterprises having their own internal networks. In such an embodiment, a network 390 may include the hardware (e.g., modems, routers, switches, load balancers, proxy servers, etc.) and software (e.g., protocol stacks, accounting software, firewall/security software, etc.) necessary to establish a networking link between given client 302 and the Internet as well as between the Internet and provider network 300. It is noted that in some embodiments, clients 302 may communicate with virtual computing resource provider 300 using a private network rather than the public Internet.

Figure 5:
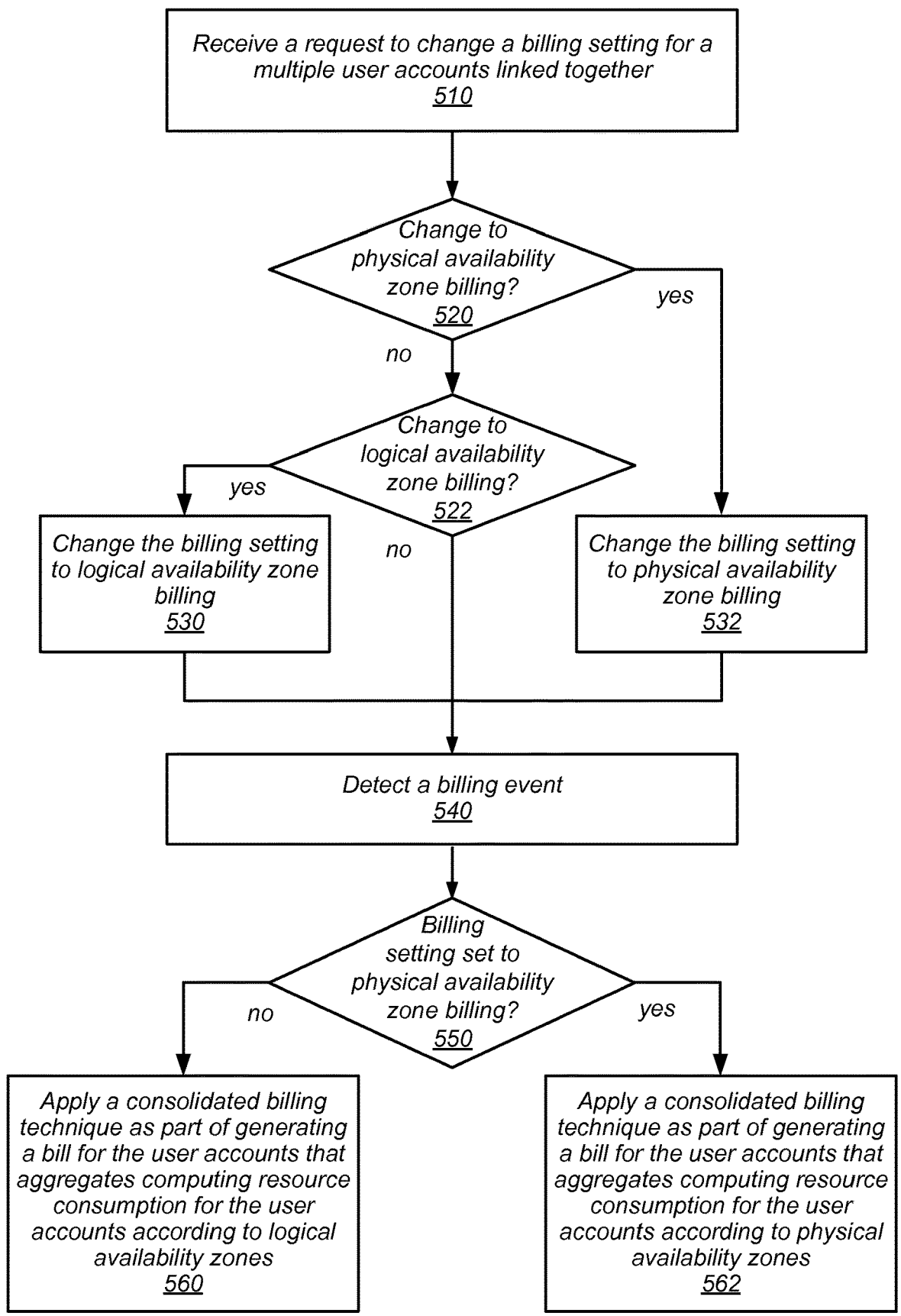
FIG. 5 is a high-level flowchart illustrating various methods and techniques for implementing consolidated billing for logical and physical availability zones of the provider network, according to some embodiments.

The examples of implementing resource management and billing for logical and physical availability zones discussed above with regard to FIGS. 1A-4 have been given in regard to a provider network. Various other types or combinations of systems may implement these techniques. For example, multiple different network-based services may utilize these techniques for logical availability zones implement for providing computing resources for the multiple different network-based services. FIG. 5 is a high-level flowchart illustrating various methods and techniques for implementing consolidated billing for logical and physical availability zones of the provider network, according to some embodiments. These techniques may be implemented using various different ones of the components of a provider network as described above with regard to FIGS. 3-4, as well as systems that may implement the described techniques.

As indicated at 510, a request may be received to change a billing setting for a multiple user accounts linked together of a provider network or other system or service offering computing resources, in various embodiments. As described above, multiple user accounts may be linked together for billing purposes. Different user accounts may correspond to different teams, groups, functions, organizations or other entities associated with the payment account. Actions with respect to the computing resources offered may be taken independently for each linked user account. For example, one user account may purchase as many or as few capacity reservations, on-demand, resources or other types of resources as necessary without approval or consent from other user accounts, in various embodiments. However, with respect to the billing setting, in some embodiments one or more specially identified payment accounts alone may be allowed to change the billing setting.

As indicated by the positive exit from 520, if the request is to change the billing setting to physical availability zone billing, then the billing setting may be changed to physical availability zone billing, as indicated at 532. If, however, as indicated by the positive exit from 522, the request is to change the billing setting to logical availability zone billing, then, as indicated at 530, the billing setting for the payment account and linked user accounts may be changed to logical availability zone billing. Account information, such as a billing tree for the multiple user accounts linked together may reflect the change so as to be applied to each of the linked user accounts.

As indicated at 540, a billing event may be detected. A billing event may be any event, trigger or cause that prompts the generation of a bill for the payment account. For example, a request for an updated billing statement or new billing statement may trigger a billing event. Similarly, automated or time period intervals (e.g., $1^{st}$ day of the month, quarter, or any other time period) or detectable condition, such as a particular usage amount, may trigger a billing event. System administrators may also request a billing statement, triggering a billing event.

As indicated at 550, in response to detecting a billing event, it may be determined whether the billing setting for the payment account is set to physical availability zone billing, in various embodiments. If so, as indicated by the positive exit from 550, then a consolidated billing technique may be applied that aggregates consumption for the user accounts linked together according to physical availability zones, as indicated at 562. As illustrated above with regard to FIG. 2B, the launch location or location of the resources, nodes, hardware, systems, or devices that provide the computing resource in a respective physical availability zone may be evaluated or examined, and aggregated together. A capacity reservation billing scheme may be applied to those portions of the aggregated consumption for which a capacity reservation was previously purchased. For instance, if the aggregate total hours for a physical availability zone was 136 hours, and the purchased capacity was for 120 hours, then the special rate for the capacity reservation may be applied to the 120 hours (leaving the remaining 16 hours to be billed differently). Please note, that in various embodiments, in order for a capacity reservation to apply (as discussed below with regard to FIG. 6), the computing resource reserved may have to be the same as the computing resource launched or consumed (e.g., same type, size, platform, or any other configuration such as those discussed above for compute instances with regard to FIG. 3). Therefore, in some embodiments, aggregation totals may be broken down into aggregated amounts for like computing resources (in order to determine the individual billing scheme whether for reserved capacity, on-demand, or spot market that applies to each type of computing resource consumed).

If the billing setting is set to logical availability zone billing, as indicated by the negative exit from 550, then a consolidated billing technique may be applied that aggregates consumption for the user accounts linked together according to logical availability zones, as indicated at 560. As illustrated above with regard to FIG. 2A, the launch location or location of the resources, nodes, hardware, systems, or devices that provide the computing resource in a respective logical availability zone may be evaluated or examined, and aggregated together. As logical availability zones may differ from user account to user account the particular data centers or physical availability zones evaluated may differ. A capacity reservation billing scheme may be applied to those portions of the aggregated usage for which a capacity reservation was previously purchased. For instance, if the aggregate total hours for a logical availability zone was 210 hours, and the purchased capacity was for 160 hours, then the special rate for the capacity reservation may be applied to the 160 hours (leaving the remaining 50 hours to be billed differently). Please note, that in various embodiments, in order for a capacity reservation to apply (as discussed below with regard to FIG. 6), the computing resource reserved may have to be the same as the computing resource launched or consumed (e.g., same, type, size, platform, or any other configuration such as those discussed above for compute instances with regard to FIG. 3) and in the same logical availability zone (which may occur at different physical availability zones). Therefore, in some embodiments, aggregation totals may be broken down into aggregated amounts for like computing resources (in order to determine the individual billing scheme whether for reserved capacity, on-demand, or spot market that applies to each type of computing resource consumed).

As capacity reservations for linked user accounts may encompass different logical availability zones, various different resource management techniques may be employed to determine when capacity reservations are to remain available. FIG. 6 is a high-level flowchart illustrating various methods and techniques for managing resources for logical and physical availability zones of the provider network, according to some embodiments. As indicated at 610, a capacity reservation request for a computing resource (or multiple computing resources) located in a physical availability zone may be received. The capacity reservation may indicate computing resource type, size, platform, or any other configuration such as those discussed above for compute instances with regard to FIG. 3. The capacity reservation may be received for a user account that is one of multiple user accounts linked together.

In response to receiving the capacity reservation request, the capacity reservation may then be made available to the multiple users linked together for consumption. Thus, if user account A (of users A, B, C, D and E) submits the capacity reservation request, then users B, C, D and E may consume the capacity request (in addition to user A). Various capacity models, reservation systems or other indicators describing capacity reservations for the physical availability zone may be updated, in various embodiments. In at least some embodiments, user accounts may be added to the payment account, and thus the reservation may be made available to the additional users. Similarly, if user accounts are removed or no longer linked to the payment account, then the reservation may be made unavailable.

As indicated at 630, computing resource consumption launched in the physical availability zone or those logical availability zones mapped to the physical availability zone for the multiple user accounts may be evaluated, in some embodiments, based on a billing setting for the payment account. For example, though the capacity reservation may be reserved for a physical availability zone, if a billing setting for the payment account is set to logical availability zone billing, then only those user accounts whose logical availability zones map to the physical availability zone may be able to launch a resource in the physical availability zone to consume the reservation. However, if the billing setting is set to physical availability zone billing, then any of the linked user accounts may be able to directly launch resources in the physical availability zone. In various embodiments, evaluating the consumption of computing resources by the linked user accounts may detect when new resources are consumed, that weren't previously consumed when resources that were being consumed are no longer being consumed (e.g., due to failure or user directed stoppage). In this way capacity reservations may be applied, enforced, or held for any of the linked user accounts without double booking or holding extra reservations at other physical availability zones than the physical availability zone for which the capacity reservation was originally made.

As indicated at 640, based, at least in part, on the consumption evaluation, it may be determined whether or not the capacity reservation is consumed. For example, the consumption may be examined to determine whether any of the computing resources being consumed match the same computing resource type, size, platform, or any other configuration as indicated in the capacity reservation request. If so, as indicated by the positive exit from 640, then capacity reservation is made unavailable to those remaining user accounts linked to the payment account who have not consumed the capacity reservation already, as indicated at 650. Thus, the various capacity models, reservation systems or other indicators describing capacity reservations for the physical availability zone may be updated, in various embodiments, to indicate that no more capacity need be held for that reservation. If, however, as indicated by the negative exit from 640, the capacity reservation is not consumed, then the capacity reservation may still be made available to the linked user accounts. Similarly, after making the capacity reservation unavailable, if it is detected again that the capacity reservation is not consumed, then the capacity reservation may again be made available to the linked user accounts, in various embodiments.

As noted above with regard to FIG. 4, clients may select to launch computing resources in a particular physical or logical availability zone. FIG. 7 is high-level flowchart illustrating various methods and techniques for launching a computing resource in a particular physical availability zone, according to some embodiments. As indicated at 710, a request may be received to launch a computing resource in a particular physical availability zone for a user account that is linked along with other user accounts to a payment account. It may be determined whether the computing resource previously submitted by another of the linked user accounts is available for the launch request, as indicated at 720. If, for example, no other user account linked to the payment account is consuming the same type or configuration of computing resource described in the capacity reservation at the physical availability zone, then the capacity reservation may be applied. As indicated at 730, the requested computing resource may be launched as the reserved computing resource in the physical availability zone to apply the capacity reservation, in various embodiments.

If, as indicated by the negative exit from 720, no computing resource for the capacity reservation is available, then it may be determined whether any other computing resource is available at the particular physical availability zone, as indicated at 740. If so (for example an on-demand or spot pricing instance is available), then the computing resource may be launched in the physical availability zone, as indicated at 750. If, however, no other resource is available at the physical availability zone, the launch request may be denied.

Similarly, FIG. 8 is high-level flowchart illustrating various methods and techniques for launching a computing resource in a particular logical availability zone, according to some embodiments. As indicated at 810, a request may be received to launch a computing resource at a particular logical availability zone for a user account that is linked along with other user accounts to a payment account. As noted above, for those user accounts linked to payment account with the billing setting set for logical availability zone billing, capacity reservations may still be associated with a particular physical availability zone. Thus, it may be determined whether the computing resource previously submitted by another of the linked user accounts is available for the launch request by first examining whether the logical availability zone in the request is mapped to a physical availability zone for which there is a capacity reservation for the linked user accounts, as indicated 812. If so, then if no other user account linked to the payment account is consuming the same type or configuration of computing resource described in the capacity reservation, as indicated at 820, then the capacity reservation may be applied. As indicated at 830, the requested computing resource may be launched as the reserved computing resource in the logical availability zone to apply the capacity reservation, in various embodiments.

If, as indicated by the negative exit from 820, no computing resource for the capacity reservation is available or the logical availability zone does not map to the physical availability zone for the capacity reservation, as indicated by the negative exit from 812, then it may be determined whether any other computing resource is available at the particular logical availability zone, as indicated at 840. If so (for example an on-demand or spot pricing instance is available), then the computing resource may be launched in the logical availability zone, as indicated at 850. If, however, no other resource is available at the logical availability zone, the launch request may be denied.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Figure 9:
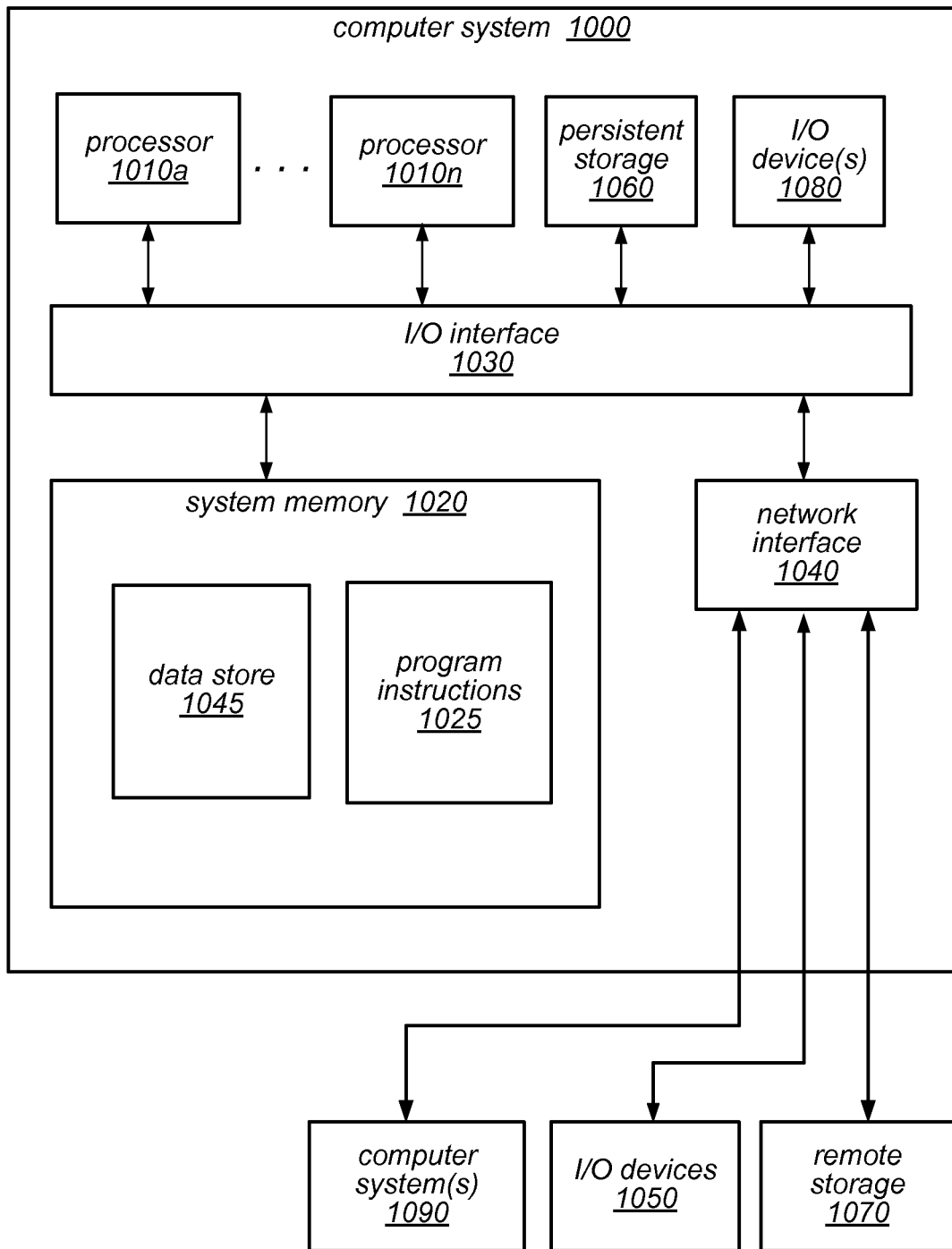
FIG. 9 is a block diagram illustrating an example computing system, according to some embodiments.

Embodiments of implementing resource management and billing for logical and physical availability zones of a provider network as described herein may be executed on one or more computer systems, which may interact with various other devices. FIG. 9 is a block diagram illustrating an example computer system, according to various embodiments. For example, computer system 1000 may be configured to implement nodes of a compute cluster, a provider network, network-based service, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a provider network that implements a network-based virtual compute service, the provider network having a plurality of compute nodes each having one or more processors and associated memory, wherein the plurality of compute nodes are divided into a plurality of physical availability zones and used to implement virtual compute instances, wherein individual ones of the plurality of physical availability zones have distinct power sources, and wherein a failure of a first one of the plurality of physical availability zones does not stop operations of a second one of the plurality of physical availability zones, the provider network configured to:
store in a persistent data store account information for a plurality of user accounts linked together to form a plurality of linked user accounts, wherein, for individual ones of the plurality of linked user accounts, one or more logical availability zones are mapped to different ones of the plurality of physical availability zones;
receive a capacity reservation request for one or more virtual compute instances located in a particular logical availability zone of the one or more logical availability zones, and evaluate, based at least in part on an indication that a usage aggregation setting is in a logical availability zone mode, virtual compute instance consumption by the linked user accounts in the particular logical availability zone to determine whether the linked user accounts have consumed the capacity reservation, wherein in the logical availability zone mode usage of the linked user accounts is aggregated for individual logical availability zones, and wherein in a physical availability zone mode usage of the linked user accounts is aggregated for individual physical availability zones;
in response to receipt of a request to change the usage aggregation setting for the plurality of linked user accounts from the logical availability zone mode to the physical availability zone mode, update the account information for the linked user accounts to change the usage aggregation setting to the physical availability zone mode;
receive, for a user account of the linked user accounts, another capacity reservation request for one or more virtual compute instances located in a particular physical availability zone of the plurality of physical availability zones;
in response to receipt of the other capacity reservation request, make another capacity reservation for the one or more virtual compute instances, wherein the other capacity reservation is available to the plurality of linked user accounts for consumption;
evaluate, based at least in part on an indication that the usage aggregation setting is in the physical availability zone mode, virtual compute instance consumption by the plurality of linked user accounts in the particular physical availability zone to determine that one or more of the plurality of linked user accounts have consumed the other capacity reservation; and
in response to the determination that the one or more of the plurality of linked user accounts have consumed the other capacity reservation, make the other capacity reservation unavailable to remaining ones of the plurality of linked user accounts.

2. The system of claim 1, wherein to evaluate the virtual compute instance consumption, the provider network is configured to determine whether virtual compute instances being consumed matches a resource type, size, or platform indicated in the capacity reservation request.

3. The system of claim 1, wherein individual ones of the plurality of physical availability zones correspond to respective data centers.

4. A method, comprising:
performing, by one or more computing devices of a provider network each implemented by one or more processors and associated memory, wherein the provider network implements a network-based virtual computing service:
storing in a persistent data store account information for a plurality of user accounts linked together to form a plurality of linked user accounts, wherein the compute devices are divided into a plurality of physical availability zones and used to implement virtual compute instances offered by the provider network, wherein individual ones of the plurality of physical availability zones have distinct power sources so that a failure of a first one of the plurality of physical availability zones does not stop operations of a second one of the plurality of physical availability zones, and wherein the account information specifies for individual ones of the plurality of linked user accounts, one or more logical availability zones that are mapped to different ones of the plurality of physical availability zones;
receiving, for a user account of the linked user accounts, a capacity reservation request for one or more virtual compute instances located in a particular logical availability zone of the one or more logical availability zones, and evaluating, based at least in part on an indication that a usage aggregation setting is in a logical availability zone mode, virtual compute instances consumption by the linked user accounts in the particular logical availability zone to determine whether the linked user accounts have consumed the capacity reservation, wherein in the logical availability zone mode usage of the linked user accounts is aggregated for individual logical availability zones, and wherein in a physical availability zone mode usage of the linked user accounts is aggregated for individual physical availability zones;
updating, in response to receiving a request to change the usage aggregation setting for the plurality of linked user accounts from a logical availability zone mode to a physical availability zone mode, the account information for the linked user accounts to change the usage aggregation setting to the physical availability zone mode;
receiving, for a user account of the plurality of linked user accounts, another capacity reservation request for one or more virtual compute instances located in a physical availability zone;

in response to receiving the capacity reservation request, making another capacity reservation for the one or more virtual compute instances, wherein the other capacity reservation is available to individual ones of the plurality of linked user accounts for consumption;

based, at least in part on a usage aggregation setting for the plurality of linked user accounts, evaluating virtual compute instance consumption for the plurality of linked user accounts in:
the physical availability zone; or
those logical availability zones for the individual ones of the plurality of linked user accounts that are mapped to the physical availability zone;

based, at least in part, on said evaluating, determining that one or more user accounts of the plurality of linked user accounts have consumed the other capacity reservation; and in response to determining that the one or more user accounts have consumed the other capacity reservation, making the other capacity reservation unavailable to remaining ones of the plurality of linked user accounts.

5. The method of claim 4, wherein evaluating the virtual compute instance consumption comprises determining whether virtual compute instances being consumed matches an instance type, or size indicated in the capacity reservation request.

6. The method of claim 4, further comprising receiving a request to launch a virtual compute instance from one of the plurality of linked user accounts, and wherein said evaluating the virtual compute instance consumption is performed in prior to launching the virtual compute instance.

7. The method of claim 4, wherein a request to launch at least one of the one or more virtual compute instances in the physical availability zone is received via a network-based interface for the provider network for one of the one or more user accounts that consumed the capacity reservation.

8. The method of claim 4, wherein a request to launch at least one of the one or more virtual compute instances in one of those logical availability zones that are mapped to the physical availability zone is received via a network-based interface for the provider network for one of the one or more user accounts that consumed the capacity reservation.

9. The method of claim 4, further comprising:
prior to determining that the capacity reservation is consumed, linking a new user account to the plurality of linked user accounts; and
wherein said making the capacity reservation available to individual ones of the plurality of linked user accounts includes the new user account.

10. A non-transitory, computer-readable storage medium, storing program instructions that when executed by one or more processors of a plurality of computing devices cause the plurality computing devices to implement:
storing in a persistent data store account information for a plurality of user accounts linked together to form a plurality of linked user accounts, wherein the plurality of compute devices are divided into a plurality of physical availability zones and used to implement virtual compute instances of a provider network that implements a network-based virtual computing service, wherein individual ones of the plurality of physical availability zones have distinct power sources so that a failure of a first one of the plurality of physical availability zones does not stop operations of a second one of the plurality of physical availability zones, and the account information specifies for individual ones of the plurality of linked user accounts, one or more logical availability zones that are mapped to different ones of the plurality of physical availability zones;

receiving a request to launch a virtual compute instance in a particular physical availability zone for a linked user account of the plurality of linked user accounts;

determining that a usage aggregation setting for the plurality of linked user accounts is set to a physical availability zone mode, wherein the usage aggregation setting can be set in the physical availability zone mode under which usage of the plurality of linked user accounts is aggregated for individual physical availability zones or a logical availability zone mode under which usage of the plurality of linked user accounts is aggregated for individual logical availability zones;

determining that a reserved virtual compute instance located in the physical availability zone is available based on a capacity reservation granted from a previously received capacity reservation request for a different one of the plurality of linked user accounts;

in response to said determination that the reserved virtual compute instance in the physical availability zone is available, applying the capacity reservation to launch the virtual compute instance as the reserved virtual compute instance;

updating, in response to receiving a request to change the usage aggregation setting for the plurality of linked user accounts from the physical availability zone mode to a logical availability zone mode, the account information for the linked user accounts to change the usage aggregation setting to the logical availability zone; and receiving, for a user account of the linked user accounts, a capacity reservation request for one or more virtual compute instances located in a particular logical availability zone of the one or more logical availability zones, and evaluating, based at least in part on an indication that a usage aggregation setting is in the logical availability zone mode, virtual compute instances consumption by the linked user accounts in the particular logical availability zone to determine whether the linked user accounts have consumed the capacity reservation.

11. The non-transitory, computer-readable storage medium of claim 10, wherein to receive the request to launch a virtual compute instance in a particular physical availability zone, the program instructions cause the one or more computing devices to implement receiving the request to launch via a network-based interface for the provider network.

12. The non-transitory, computer-readable storage medium of claim 10, wherein the program instructions further cause the one or more computing devices to implement receiving a request to obtain the capacity reservation identifying the particular physical availability zone for the different user account of the plurality of linked user accounts.

13. The non-transitory, computer-readable storage medium of claim 12, wherein to receive the request to obtain the capacity reservation, the program instructions cause the one or more computing devices to implement receiving the request to obtain the capacity reservation via a network-based interface for the provider network.

14. The non-transitory, computer-readable storage medium of claim 10, wherein the program instructions further cause the one or more computing devices to implement providing one or more virtual compute instance computing resource reservation recommendations based, at least in part on the usage aggregation setting for the plurality of linked user accounts.

\* \* \* \* \*